United States Patent
Lee

(10) Patent No.: US 11,852,723 B2
(45) Date of Patent: Dec. 26, 2023

(54) SYSTEM AND METHOD FOR CONTROLLING DETECTING DISTANCE OF ULTRASONIC SENSOR BASED ON GROUND RECOGNITION

(71) Applicant: HYUNDAI MOBIS CO., LTD., Seoul (KR)

(72) Inventor: Jae Young Lee, Yongin-si (KR)

(73) Assignee: HYUNDAI MOBIS CO., LTD., Seoul (KR)

( * ) Notice: Subject to any disclaimer, the term of this patent is extended or adjusted under 35 U.S.C. 154(b) by 228 days.

(21) Appl. No.: 17/553,247

(22) Filed: Dec. 16, 2021

(65) Prior Publication Data

US 2022/0187453 A1 Jun. 16, 2022

(30) Foreign Application Priority Data

Dec. 16, 2020 (KR) .................. 10-2020-0176797
Dec. 16, 2020 (KR) .................. 10-2020-0176798

(51) Int. Cl.
*G01S 15/93* (2020.01)
*G06T 7/73* (2017.01)
*G01S 15/931* (2020.01)

(52) U.S. Cl.
CPC .............. *G01S 15/931* (2013.01); *G06T 7/73* (2017.01); *G06T 2207/30264* (2013.01)

(58) Field of Classification Search
CPC .... G01S 7/52004; G01S 7/527; G01S 15/931; G01S 15/86; G06T 7/73; G06T 2207/30264
See application file for complete search history.

(56) References Cited

U.S. PATENT DOCUMENTS

2005/0004719 A1* 1/2005 Dickmann ............ G01S 13/931
701/1
2016/0019395 A1* 1/2016 Ramalingam ....... H04L 63/1416
726/1
2017/0285161 A1* 10/2017 Izzat ..................... G01S 17/931
(Continued)

OTHER PUBLICATIONS

G. Singh, R. Kumar and P. Kashtriya, "Detection of Potholes and Speed Breaker on Road," 2018 First International Conference on Secure Cyber Computing and Communication (ICSCCC), Jalandhar, India, 2018, pp. 490-495, doi: 10.1109/ICSCCC.2018.8703298. (Year: 2018).*

*Primary Examiner* — Daniel L Murphy
*Assistant Examiner* — Amie M Ndure
(74) *Attorney, Agent, or Firm* — NovoTechIP International PLLC

(57) ABSTRACT

Provided is a system for controlling a detecting distance of an ultrasonic sensor based on ground recognition. The system includes: an ultrasonic sensor provided in a vehicle and configured to, when driven, recognize an object in front of or behind the vehicle; an image capturing unit configured to capture an image of a detection area of the ultrasonic sensor; a ground type recognizer configured to recognize a ground type corresponding to the detecting area of the ultrasonic sensor using the image acquired through the image capturing unit; and a sensing threshold changer configured to, when a travelling speed of the vehicle satisfies a preset condition, change a sensing threshold of the ultrasonic sensor according to the recognized ground type.

12 Claims, 12 Drawing Sheets

(56) References Cited

U.S. PATENT DOCUMENTS

2020/0110419 A1\* 4/2020 Jin .................. G01S 13/931
2020/0114910 A1\* 4/2020 Han ................. B60W 30/0956
2021/0019534 A1\* 1/2021 Sakamoto ........... G01S 17/86

\* cited by examiner

SYSTEM AND METHOD FOR CONTROLLING DETECTING DISTANCE OF ULTRASONIC SENSOR BASED ON GROUND RECOGNITION

CROSS-REFERENCE TO RELATED APPLICATIONS

This application claims priority to and the benefit of Korean Patent Applications No. 10-2020-0176797, filed on Dec. 16, 2020, and Korean Patent Applications No. 10-2020-0176798, filed on Dec. 16, 2020, the disclosure of which is incorporated herein by reference in their entirety.

BACKGROUND OF THE INVENTION

1. Field of the Invention

The present invention relates to a system and method for controlling a detecting distance of ultrasonic sensor based on ground recognition, and more specifically, to a system for controlling a detecting distance of an ultrasonic sensor based on ground recognition that is capable of adjusting the detecting distance of the ultrasonic sensor.

2. Discussion of Related Art

In general, an ultrasonic sensor for a vehicle distinguishes the ground from an obstacle by the magnitude of reflected waves.

That is, when a signal is greater than a ground signal having a specific threshold, it is determined that the signal is reflected from an obstacle.

In order to reduce the probability of misrecognition of an ultrasonic sensor, as shown in FIG. 1, the ultrasonic sensor for a vehicle acquires ground waveforms according to time from various shaped road surfaces, extracts a maximum value among the acquired waveforms, and then adds a margin to the maximum value so that a threshold is determined.

In general, such an ultrasonic sensor for a vehicle is vulnerable to environmental changes due to using physical waves.

Therefore, in order for the ultrasonic sensor to be robust to environmental changes, the threshold is set on the basis of the maximum ground waveform generated from a Belgian road, gravel road, or the like.

Here, the high threshold lowers the probability of a false alarm, but there is a limitation that the detecting distance decreases, as shown in FIG. 2, because an ultrasonic signal reflected from an obstacle decreases with distance.

Recently, an autonomous controller requires a wider detection area for parking space search and mitigation of collisions with pedestrians.

However, in a long range, the ground falls within a beam angle with the ultrasonic sensor as shown in FIG. 3, and thus the ground waveform obtained in the worst case is larger than a reflected wave of an object.

Moreover, in an environment of travelling in a parking lot, a vehicle is able to travel up to 10 km/h so that additional attenuation occurs due to the Doppler effect, for which there is a difficulty in increasing the detecting distance.

Meanwhile, since a smart parking assistance system (SPAS), an ultrasonic sensor having a detecting distance of 4 m or more has been developed, but due to the maximum ground wave that is high, is developed with a beam angle reduced in the elevation direction.

Since ultrasonic sensors mounted on front/rear bumpers need to detect a curb at the height of the bumper in a short range, the beam angle cannot be reduced so that an undetected area is generated even when the reception amplification rate is increased.

Moreover, when travelling at about 10 km/h in a parking environment, additional attenuation by a receiving filter occurs due to Doppler phenomenon. Accordingly, currently, the controller has no choice but to use the ultrasonic sensor mounted on front/rear bumpers only for the detection of short range.

BRIEF SUMMARY OF THE INVENTION

The present invention is directed to providing a system for controlling a detecting distance of an ultrasonic sensor based on ground recognition that is capable of, in order to increase the usability of ultrasonic waves in an application field to detect a parking space and prevent a collision with a pedestrian, recognizing an obstacle in a long range rather than a short range by adjusting the threshold of the ultrasonic sensor according to the recognized ground type.

The technical objectives of the present invention are not limited to the above, and other objectives may become apparent to those of ordinary skill in the art based on the following description.

According to an aspect of the present invention, there is provided a system for controlling a detecting distance of an ultrasonic sensor based on ground recognition, the system including: an ultrasonic sensor provided in a vehicle and configured to, when driven, recognize an object in front of or behind the vehicle; an image capturing unit configured to capture an image of a detection area of the ultrasonic sensor; a ground type recognizer configured to recognize a ground type corresponding to the detection area of the ultrasonic sensor using the image acquired through the image capturing unit; and a sensing threshold changer configured to, when a travelling speed of the vehicle satisfies a preset condition, change or adjust a threshold of the ultrasonic sensor according to the recognized ground type.

The system may further include a sensing threshold setter configured to set the threshold of the ultrasonic sensor according to the recognized ground type.

The sensing threshold setter may be configured to, in order to reduce a probability of a false alarm caused by ground reflected waves, measure waveforms reflected from various types of ground including an asphalt road, a concrete road, a gravel road, and a Belgian road at a vehicle development operation, and add a margin to a maximum ground reflected waveform to determine the threshold of the ultrasonic sensor for the vehicle.

The sensing threshold setter may be configured to store the ground waveforms to be distinguished by the types of ground and adds each margin to a maximum value of the ground waveform for each ground type to determine the threshold.

The sensing threshold setter may be configured to set a default threshold of each of the ground waveforms on the basis of the maximum value.

The ground type recognizer may be configured to use a semantic segmented deep learning network for pixels corresponding to the detection area of the ultrasonic sensor using a camera to classify the ground type.

The ground type recognizer may be configured to select a default ground type as the ground type when a ratio of a number of pixels classified as a corresponding ground type to a number of region of interest (ROI) pixels is smaller than an area ratio threshold, when an average softmax output value of the corresponding ground type is smaller than an average confidence level threshold, or when a standard deviation of a softmax output value of the corresponding ground type is smaller than a standard deviation threshold of a confidence level.

The sensing threshold changer may be configured to, when an operation condition of the ultrasonic sensor is satisfied, recognize the ground type and change or adjust a setting of the ultrasonic sensor to a threshold value corresponding to the ground type.

The sensing threshold changer may be configured to, during parking, operate the ultrasonic sensor according to a selected threshold and periodically perform the recognition of the ground type.

According to an aspect of the present invention, there is provided a method of controlling a detecting distance of an ultrasonic sensor based on ground recognition, the method including: acquiring, at a vehicle development operation, camera images and ground reflected waveforms of an ultrasonic sensor for each ground type through actual measurement; generating thresholds for each ground type and storing the generated thresholds for each ground type; identifying whether an operation condition of the ultrasonic sensor is satisfied; recognizing a ground type from the camera image when the operation condition of the ultrasonic sensor is satisfied; and determining a threshold of the ultrasonic sensor according to the recognized ground type.

The recognizing of the ground type may further include: calculating a ground type and a probability value of each pixel and determining the ground type on the basis of a ratio of the ground type in a region of interest (ROI) and an average and standard deviations of the probability value.

BRIEF DESCRIPTION OF THE DRAWINGS

The above and other objects, features and advantages of the present invention will become more apparent to those of ordinary skill in the art by describing exemplary embodiments thereof in detail with reference to the accompanying drawings, in which.

DETAILED DESCRIPTION OF THE INVENTION

Hereinafter, advantages, features, and ways to achieve them will become readily apparent with reference to descriptions of the following detailed embodiments when considered in conjunction with the accompanying drawings. However, the scope of the present invention is not limited to such embodiments, and the present invention may be realized in various forms. The embodiments to be described below are only embodiments provided to complete the disclosure of the present invention and assist those skilled in the art to completely understand the scope of the present invention. The present invention is defined only by the scope of the appended claims. Meanwhile, terms used herein are used to aid in the explanation and understanding of the present invention and are not intended to limit the scope and spirit of the present invention. It should be understood that the singular forms "a" and "an" also include the plural forms unless the context clearly dictates otherwise. The terms "comprises," "comprising," "includes," and/or "including," when used herein, specify the presence of stated features, integers, steps, operations, elements, components and/or groups thereof and do not preclude the presence or addition of one or more other features, integers, steps, operations, elements, components, and/or groups thereof.

Figure 1:
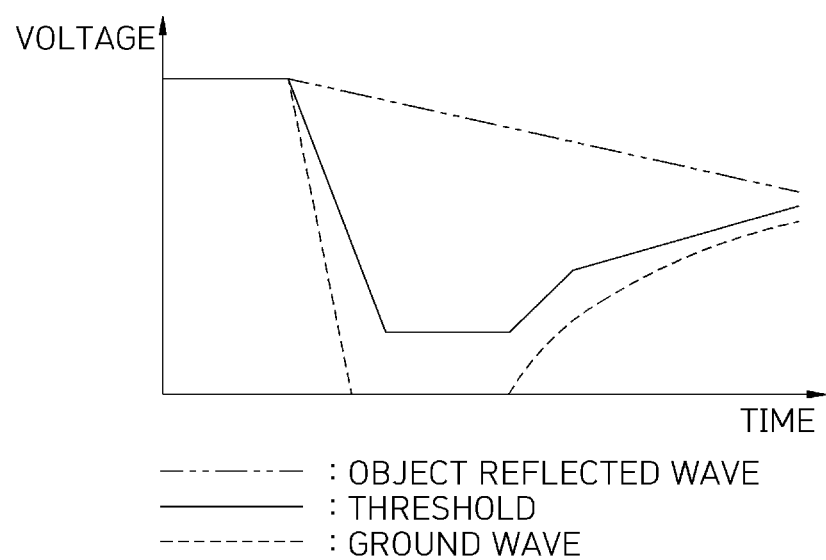
FIG. 1 is a graph for describing a reflection waveform and a threshold of a general short-range ultrasonic sensor according to time.
Figure 2:
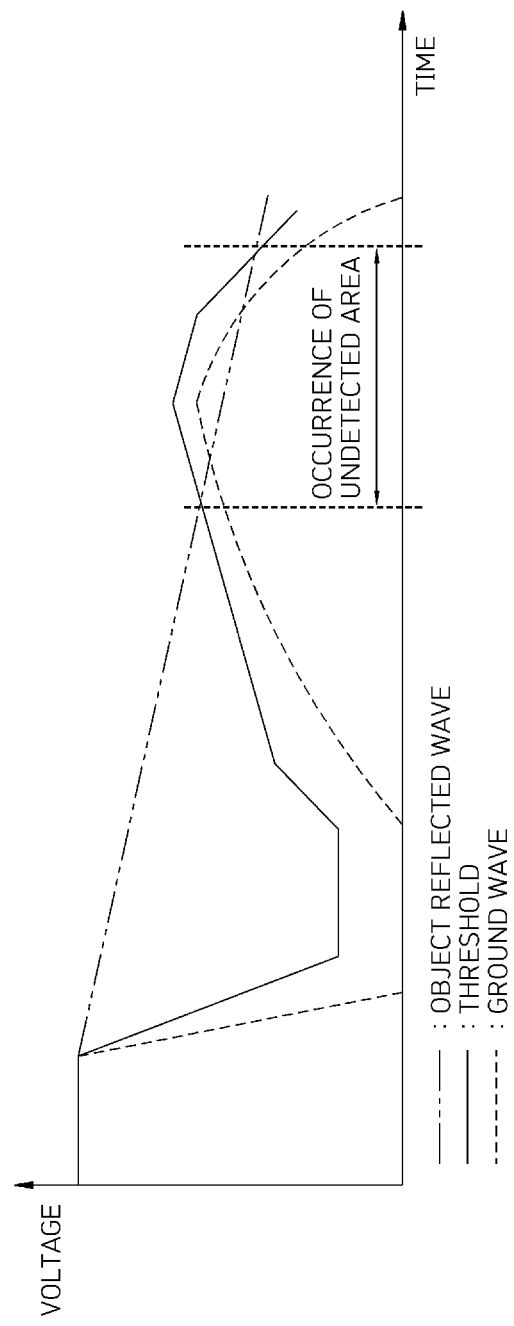
FIG. 2 is a graph for describing a reflection waveform and a threshold of a general long-range ultrasonic sensor according to time.
Figure 3:
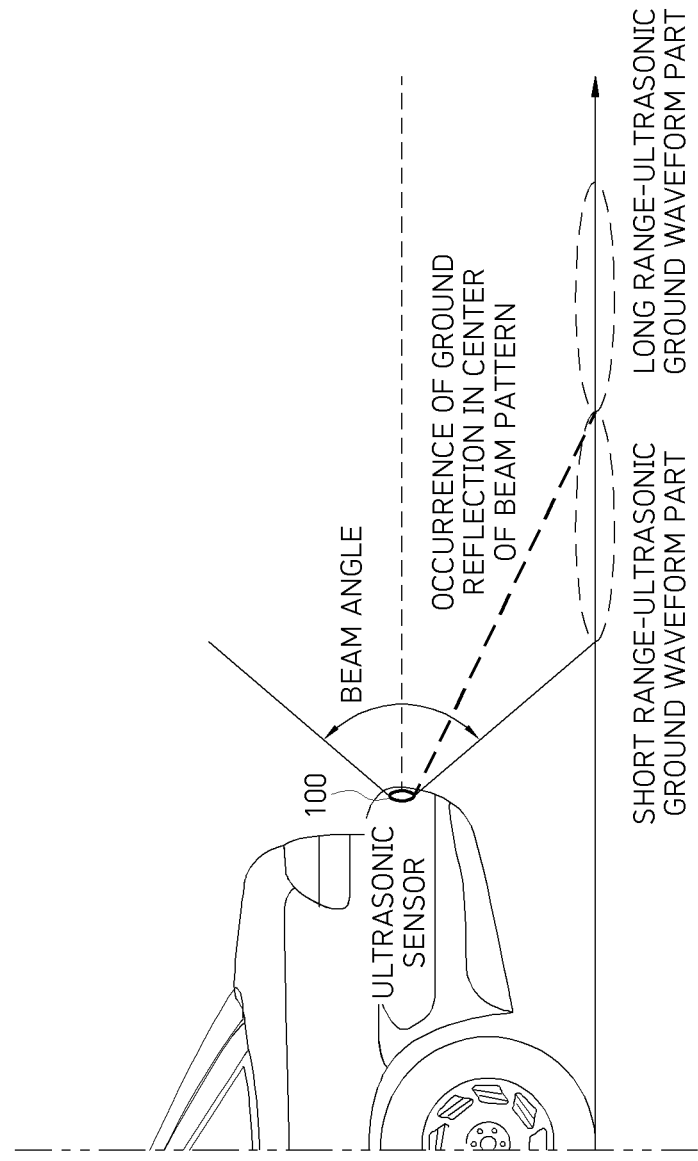
FIG. 3 is a reference diagram for describing a path in which a ground wave of a long-range ultrasonic sensor is generated at a high amplitude.
Figure 4:
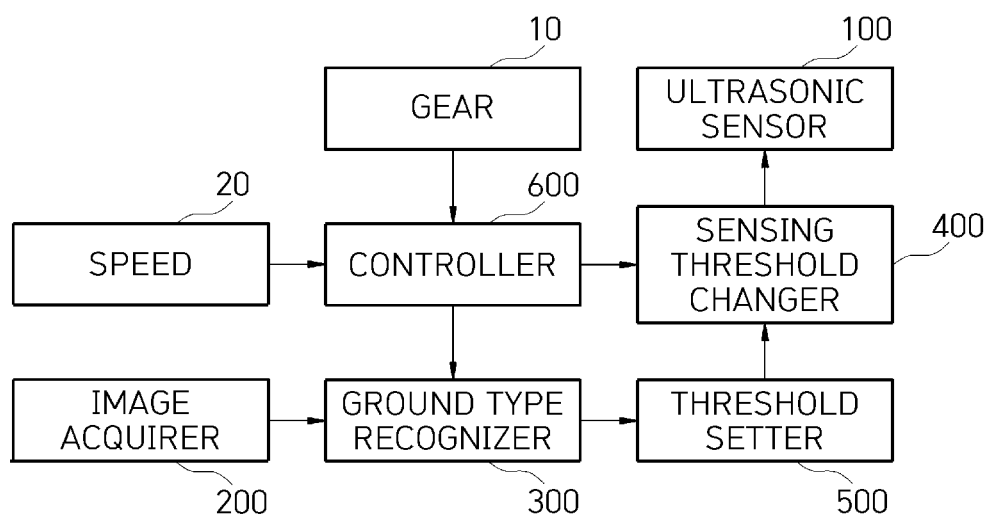
FIG. 4 is a block diagram illustrating a system for controlling a detecting distance of an ultrasonic sensor based on ground recognition according to an embodiment of the present invention.

FIG. 4 is a block diagram illustrating a system for controlling a detecting distance of an ultrasonic sensor based on ground recognition according to an embodiment of the present invention.

Referring to FIG. 4, a system for controlling a detecting distance of an ultrasonic sensor based on ground recognition according to the embodiment of the present invention includes an ultrasonic sensor 100, an image capturing unit 200, a ground type recognizer 300, a sensing threshold changer 400, a sensing threshold setter 500, and a controller 600.

The ultrasonic sensor 100 is provided on the front or rear of a vehicle and driven to recognize an object in front of or behind the vehicle when the vehicle is in a parking mode.

The image capturing unit 200 captures an image of a detection area of the ultrasonic sensor 100. The image capturing unit 200 according to the embodiment of the present invention is provided using a surround view monitor (SVM) camera mounted on the vehicle.

The ground type recognizer 300 recognizes a type of a ground (or a ground type) corresponding to the detection area of the ultrasonic sensor 100 using the image captured by the image capturing unit 200.

The sensing threshold changer 400 changes or adjusts the threshold of the ultrasonic sensor 100 according to the recognized ground type in response to a parking mode in which the travelling speed of the vehicle satisfies a preset condition. In the embodiment of the present invention, in order to reduce the probability of a false alarm, the threshold of the ultrasonic sensor is set on the basis of the maximum ground waveform in advance.

Accordingly, the embodiment of the present invention has an effect of increasing the sensing range of the ultrasonic sensor by recognizing the ground type from the acquired image and changing the ultrasonic sensing threshold according to the recognized ground type.

That is, since the threshold of the ultrasonic sensor according to the embodiment of the present invention is set on the basis of the maximum ground waveform to reduce the probability of a false alarm, when the recognized ground is an asphalt road or indoor parking lot having a relatively small ground waveform, the threshold may be lowered to improve the detecting distance.

On the other hand, the present invention, in order to set the threshold of the ultrasonic sensor according to the ground type, further includes a sensing threshold setter 500 configured to acquire an image of a ground captured through the image capturing unit 200, acquire a waveform of the ultrasonic sensor for the ground, calculate the maximum value of the ground wave of the ground, and generate a threshold of the ground on the basis of the calculated maximum value of the ground wave.

The sensing threshold setter 500, in order to reduce a probability of a false alarm caused by ground reflected waves, measures waveforms reflected from various types of ground including an asphalt road, a concrete road, a gravel road, and a Belgian road at a vehicle development operation, and add margins to maximum ground reflected waveforms to determine each threshold as the threshold for the ultrasonic sensor for the vehicle.

Figure 5:
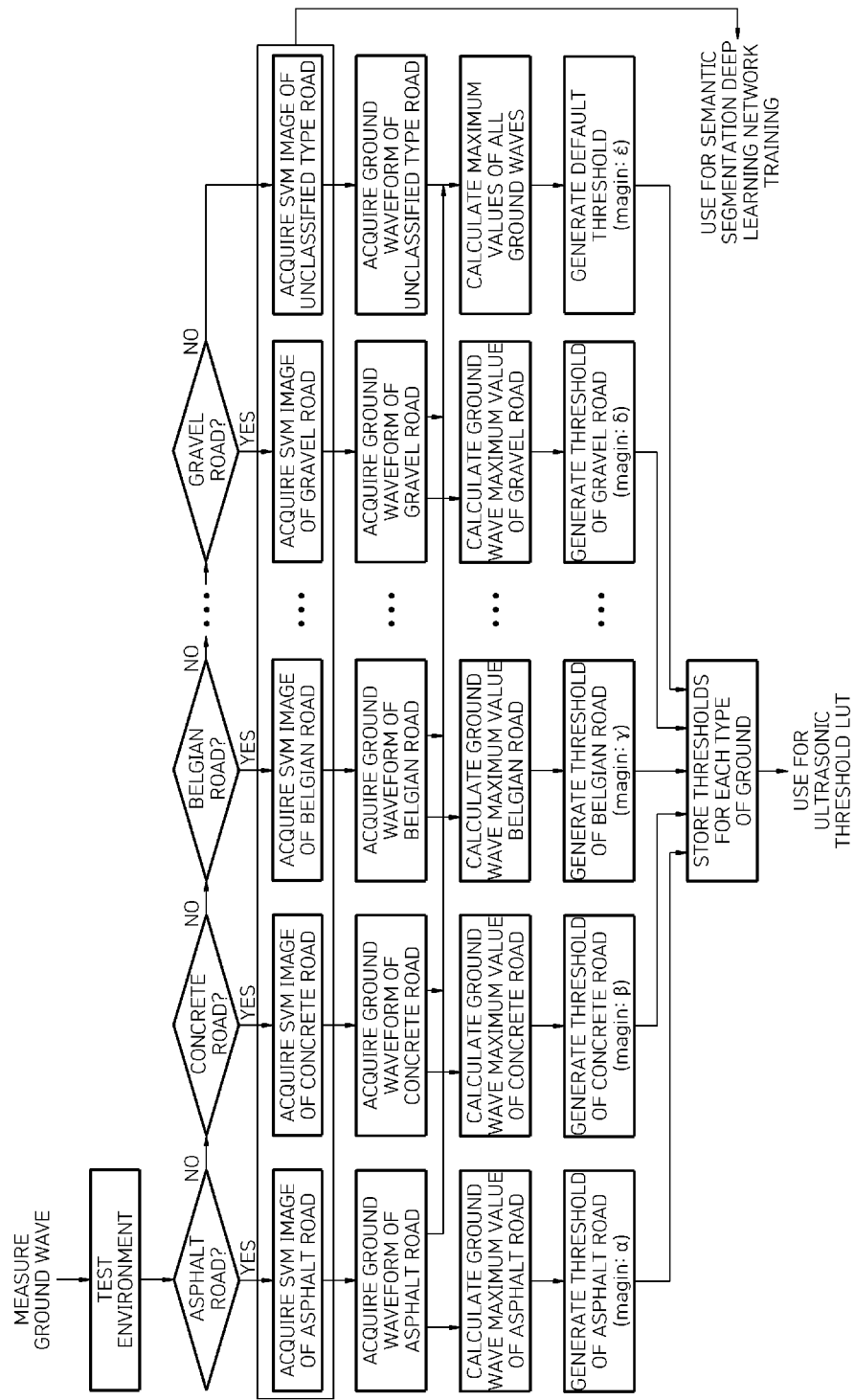
FIG. 5 is a reference diagram for describing a method of measuring ultrasonic ground-reflected waves and generating thresholds for each ground type according to an embodiment of the present invention.

In addition, referring to FIG. 5, the sensing threshold setter 500 stores ground waveforms, which are obtained through an experiment in a separate test environment, to be distinguished according to each ground type, wherein an image of each ground is acquired, the ground waveform of the ultrasonic sensor is acquired during the acquisition of the image, the maximum value of the ground waveform of the ultrasonic sensor for each ground type is calculated, and then a margin of the corresponding ground is added to the maximum value to determine the threshold. In this case, the acquired image is used for training a semantic segmentation deep learning network, and the determined thresholds for each ground type are used for ultrasonic threshold control according to the ground. In addition, when calculating the maximum value of the ground wave of an unclassified ground type among the types of ground, the maximum values of all the ground waves may be summed or averaged.

Figure 6:
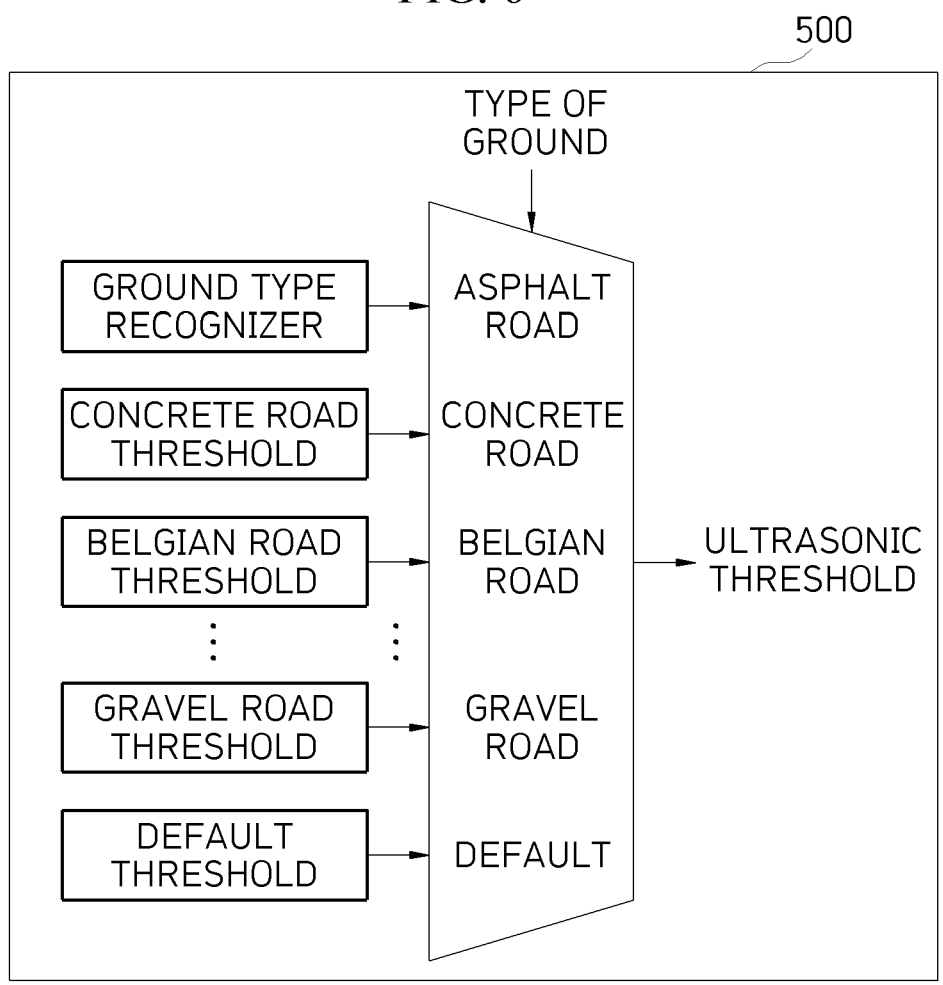
FIG. 6 is a reference diagram for describing a configuration for selecting an ultrasonic threshold according to an embodiment of the present invention.

In addition, the sensing threshold setter 500 may set a default threshold of each ground waveform on the basis of the maximum value. That is, when there are n types of ground, n+1 thresholds are generated based on measurement values as shown in FIG. 6. In the present embodiment, an asphalt road threshold, a concrete road threshold, a Belgian road threshold, a gravel road threshold, and a default threshold are defined, but different types of road may be further included.

Since the ground type is classified using a SVM camera image, the SVM camera image is stored when the ground reflected wave is measured.

The ground type recognizer 300 according to the embodiment of the present invention uses an image (an SVM image) received through the image capturing unit 200 when the operation of the ultrasonic sensor starts in a parking environment.

Figure 7:
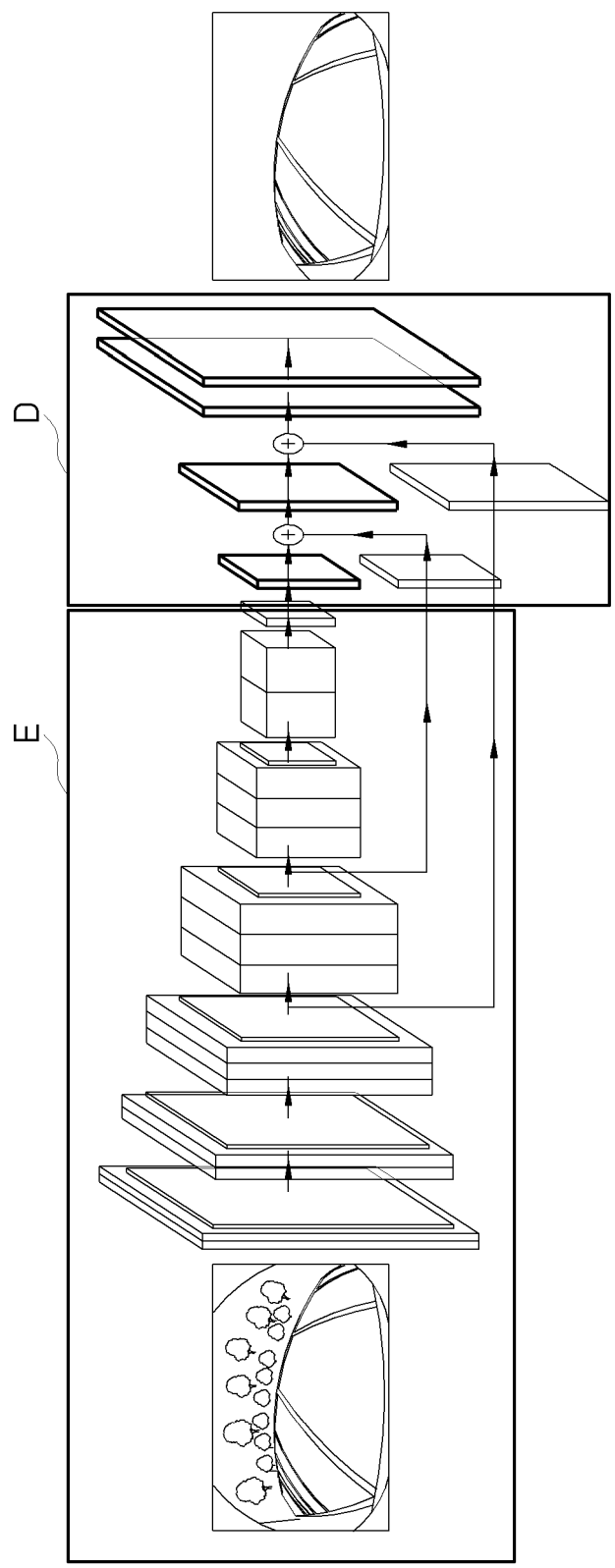
FIG. 7 is a reference diagram for describing the structure of a semantic segmentation network used for ground recognition according to an embodiment of the present invention.
Figure 8:
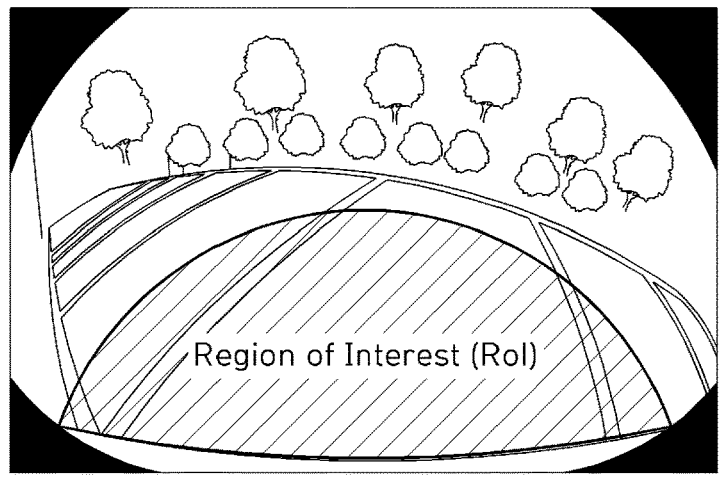
FIG. 8 is a diagram illustrating a region of interest (ROI) in an image acquired according to an embodiment of the present invention.
Figure 9:
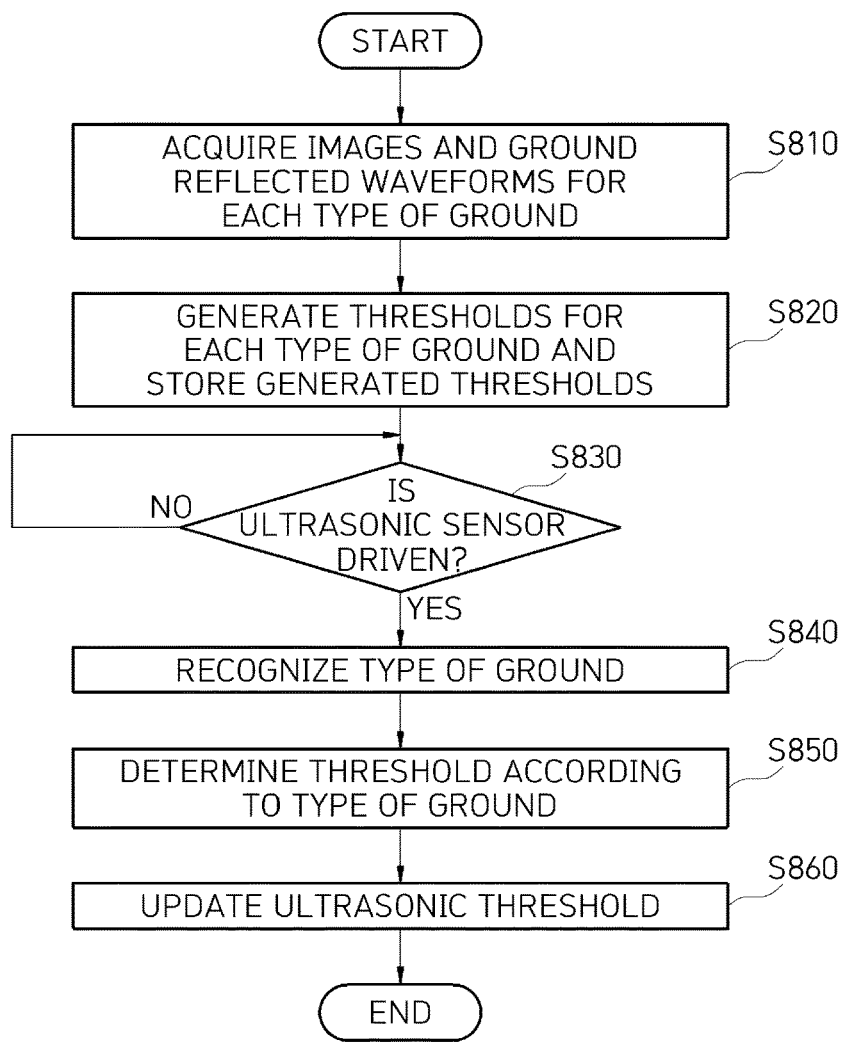
FIG. 9 is a flowchart showing a method of controlling a detecting distance of an ultrasonic sensor based on ground recognition according to an embodiment of the present invention.

In this case, the ground type recognizer 300 sets a region of interest (ROI) region as shown in FIG. 8 for more accurate recognition and uses a well-known semantic segmentation deep learning network comprises an encoder (E) and decoder (D) as shown in FIG. 7 to recognize the ground type.

Accordingly, when the ground within the ROI is classified as a specific ground having a predetermined probability or higher, the sensing threshold changer 400 updates the sensing threshold of the ultrasonic sensor 100 with a threshold set for the corresponding ground.

Basically, since the threshold of the ultrasonic sensor is set in consideration of the worst situation, the threshold is lowered in a situation not corresponding to the ground so that the detecting distance of the ultrasonic sensor is increased.

In addition, when the threshold of the ultrasonic sensor is changed or adjusted, the value of an obstacle detecting distance detectable by the ultrasonic sensor is increased.

On the other hand, although the classified ground information that enables control of characteristics of the ultrasonic sensor according to the ground type is provided to the controller 600, the ground classification does not need to be performed in real time. Accordingly, with the controller 600 using a deep learning network for parking environment recognition, the present invention may be implemented without additional costs. In addition, when the controller 600 uses a semantic segmentation deep learning network, the present invention may be implemented with a low amount of computation by adding only a head to a decoder.

The ground type recognizer 300 may classify the ground type by applying a semantic segmentation deep learning network to pixels corresponding to the detection area of the ultrasonic sensor 100 using the image capturing unit 200.

The ground type recognizer 300 according to the embodiment may be configured to, based on an image of a SVM camera, which is the image capturing unit 200, classify pixels corresponding to the detection area of the ultrasonic sensor into the types of ground (an asphalt road, a concrete road, a gravel road, a Belgian road, etc.) using a semantic segmentation deep learning network as shown in FIG. 7.

In addition, the ground type recognizer 300, when there are k types of ground, may classify pixels into k+1 classes by adding a class that is not a ground because the pixels within the ROI may be an obstacle.

For example, because the pixels in the ROI (see FIG. 8) may be an obstacle, when there are k types of ground, a class other than a ground is added so that the pixels are classified into k+1 classes.

In the case of an output of the semantic segmentation deep learning network, the ground type recognizer 300 identifies whether the ratio of the number of pixels classified as a corresponding ground type to the number of ROI pixels is larger than an area ratio threshold, and when a result of the identification is that the ratio of the number of pixels classified as the corresponding ground type to the number of ROI pixels is larger than the area ratio threshold (YES), identifies whether the average softmax output value of the corresponding ground type is larger than an average confidence level threshold.

When a result of the identification is that the average softmax output value of the corresponding ground type is larger than the average confidence level threshold (YES), the ground type recognizer 300 identifies whether a standard deviation of the softmax output value of the corresponding ground type is larger than a standard deviation threshold of the confidence level.

When a result of the identification is that the standard deviation of the softmax output value of the corresponding ground type is larger than the standard deviation threshold of the confidence level (YES), the ground type recognizer 300 calculates the numbers of pixels in the ROI for each ground type and selects a ground type having the maximum number of pixels in the ROI as the ground type.

On the other hand, the ground type recognizer 300 may select a basic ground type as the ground type when the ratio of the number of pixels classified as the corresponding ground type to the number of ROI pixels is smaller than the area ratio threshold, when the average softmax output value of the corresponding ground type is smaller than the average confidence level threshold, or when the standard deviation of the softmax output value of the corresponding ground type is smaller than the standard deviation threshold of the confidence level.

As described above, when the threshold is variably adjusted according to the ground type, in order to lower the probability of a false alarm, the rate of recognizing the ground type needs to be high. Therefore, when the uncertainty on recognition is high, a default threshold set based on the maximum ground wave may be used to lower the probability of misrecognition.

In the embodiment of the present invention, three indicators are used as to determine whether the ground recognition is successful.

First, the ratio of an area having the corresponding class is used. When a ground is a mixed type ground as a result of recognition, it is not identified whether the ground has a misrecognized pixel or a mixture of types of actual ground. Therefore, when the area of a specific class is higher than a criterion, it is determined that the recognition is being successful.

Second, the average confidence level is used. Even when the ground is a single ground type, a low confidence level may result in misrecognition of the ground type.

Therefore, when a corresponding class has an average confidence level higher than a criterion, it is determined that the recognition is being successful.

Finally, the standard deviation of the confidence level is used. Even with a high average value, a large standard deviation may indicate a mixed ground type. Accordingly, when a standard deviation of the confidence level is smaller than a criterion, it is determined that the recognition is successful.

When the sensing threshold changer 400 according to the embodiment of the present invention satisfies an operation condition of the ultrasonic sensor, after first recognizing the ground type, the setting of the ultrasonic sensor is changed or adjusted to a threshold corresponding to the ground type.

Meanwhile, the controller 600 performs the operation of the ultrasonic sensor according to a gear 10 and a travelling speed 20. That is, the controller 600 identifies whether the gear of the vehicle is in reverse R.

When the gear is in reverse R, the type of road is recognized to control the threshold of the ultrasonic sensor according to the ground type.

On the other hand, when the gear is positioned in drive D, the controller 600 identifies whether the travelling speed is less than a threshold speed (e.g., 10 km/h) and recognizes the ground type.

Thereafter, the controller 600 initializes the ultrasonic sensor with an ultrasonic sensing threshold suitable for the ground type and then starts the operation.

The embodiment of the present invention may control the ultrasonic sensing threshold according to the speed of the vehicle and thus may be used not only in a parking mode but also in a low-speed travelling.

The currently used threshold index is transmitted to the controller 600 to perform vehicle control to reflect characteristics of a detecting distance of the ultrasonic sensor that is increased, and the sensing threshold changer 400, when a control unit implementing the sensing threshold changer 400 has enough capacity for computation, may periodically perform recognition of the ground type. When the ground type is changed, the threshold of the ultrasonic sensor may need to be initialized again.

Figure 10:
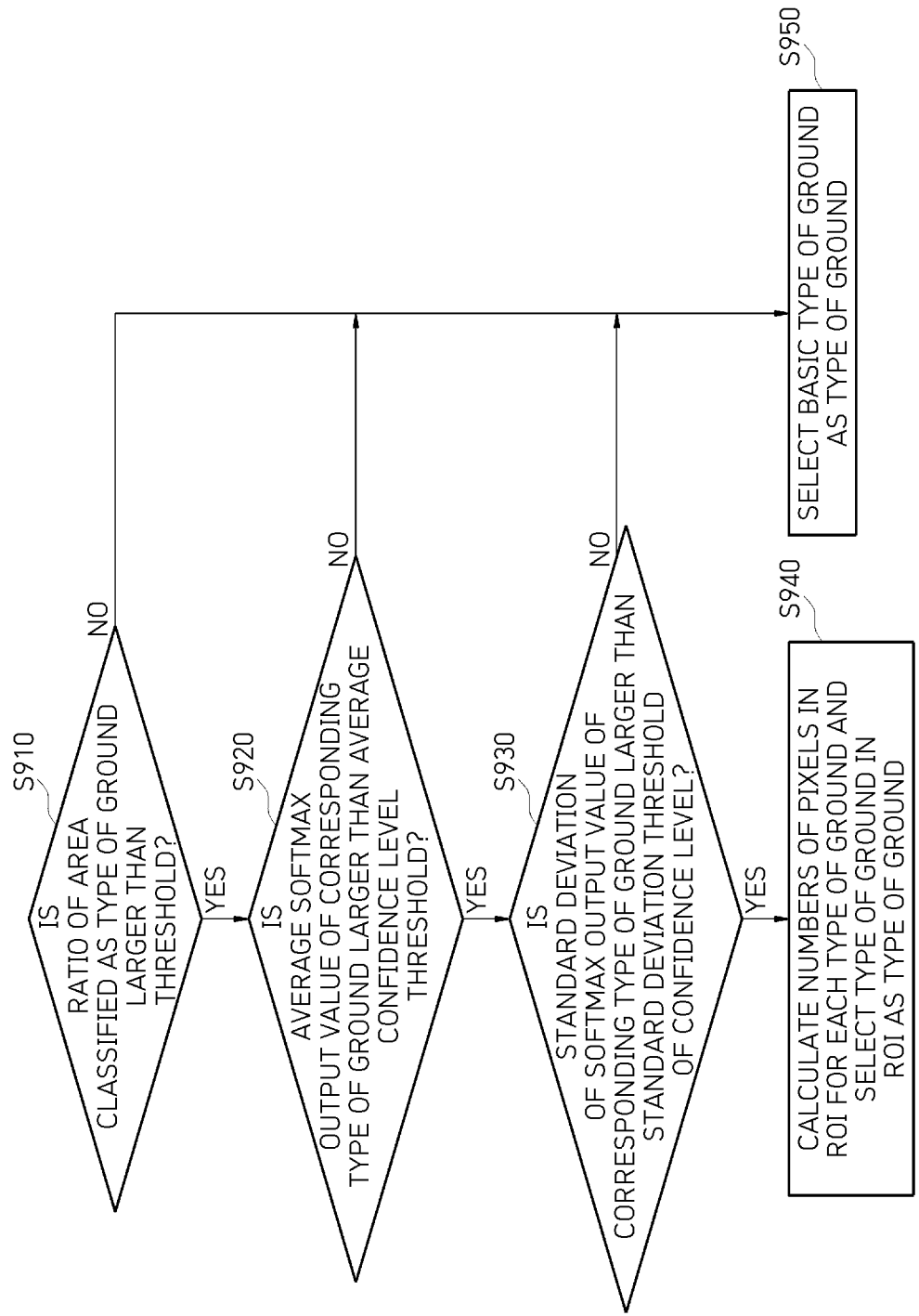
FIG. 10 is a flowchart showing a method of controlling a detecting distance of an ultrasonic sensor based on ground recognition according to an embodiment of the present invention.

FIG. 10 is a flowchart showing a method of controlling a detecting distance of an ultrasonic sensor based on ground recognition according to an embodiment of the present invention.

Hereinafter, a method of controlling a detecting distance of an ultrasonic sensor based on ground recognition according to an embodiment of the present invention will be described with reference to FIG. 10.

First, images for each ground type and ground reflected waveforms of the ultrasonic sensor for each ground type are acquired through actual measurement during a development stage of the vehicle (S810).

The threshold for each ground type is generated and stored in the sensing threshold changer (S820).

It is identified whether the operation condition of the ultrasonic sensor is satisfied (S830).

When the operation condition of the ultrasonic sensor is satisfied in the identification operation (YES in operation 830), the ground type is recognized from the image (S840).

Next, the threshold of the ultrasonic sensor according to the recognized ground type is determined (S850).

Accordingly, the threshold of the ultrasonic sensor is updated with the threshold obtained in the actual measurement using the determined ground type (S860).

Accordingly, the embodiment of the present invention has an effect of increasing the detecting distance by controlling the ultrasonic sensor specialized for short range sensing.

Accordingly, the embodiment of the present invention has an effect of improving the reliability of an application field of mitigating and preventing collisions with pedestrians by improving the detecting distance of the ultrasonic sensor on an asphalt road traveling at high speed or an indoor parking lot environment.

In addition, the embodiment of the present invention has an effect of increasing the detecting distance of an ultrasonic sensor for an SPAS having a small beam angle in the elevation direction, thereby increasing the parking space detection ability while reducing the automatic parking failure rate.

Hereinafter, a detailed process of the operation S840 of recognizing the ground type according to the embodiment of the present invention will be described.

First, in the operation S840 of recognizing the ground type, the ground type and a probability value for each pixel are calculated, and the ground type is determined on the basis of the ratio of the ground type in the ROI, and the average and the standard deviation of the probability value.

Referring to FIG. 10, the ground type recognizer 300, in the case of an output of a semantic segmentation deep learning network, identifies whether the ratio of the number of pixels classified as a corresponding ground type to the number of ROI pixels is larger than an area ratio threshold (S910), and when a result of the identification is that the ratio of the number of pixels classified as the corresponding ground type to the number of ROI pixels is larger than the area ratio threshold (YES in operation S910), identifies whether the average softmax output value of the corresponding ground type is larger than an average confidence level threshold (S920).

When a result of the identification is that the average softmax output value of the corresponding ground type is larger than the average confidence level threshold (YES in operation S920), the ground type recognizer 300 identifies whether a standard deviation of the softmax output value of the corresponding ground type is larger than a standard deviation threshold of the confidence level (S930).

When a result of the identification is that the standard deviation of the softmax output value of the corresponding ground type is larger than the standard deviation threshold of the confidence level (YES in operation S930), the ground type recognizer 300 calculates the numbers of pixels in the ROI for each ground type and selects a ground type having the maximum number of pixels in the ROI as the ground type (S940).

On the other hand, the ground type recognizer 300 may select a basic ground type as the ground type when the ratio of the number of pixels classified as the corresponding ground type to the number of ROI pixels is smaller than the area ratio threshold, when the average softmax output value of the corresponding ground type is smaller than the average confidence level threshold, or when the standard deviation of the softmax output value of the corresponding ground type is smaller than the standard deviation threshold of the confidence level (S950).

As described above, the present invention has an effect of more accurately recognizing a road type by setting a ROI in an acquired image and determining the ground type through criteria, such as the ratio of the ground type, and the average and standard deviation of a probability value.

Figure 11:
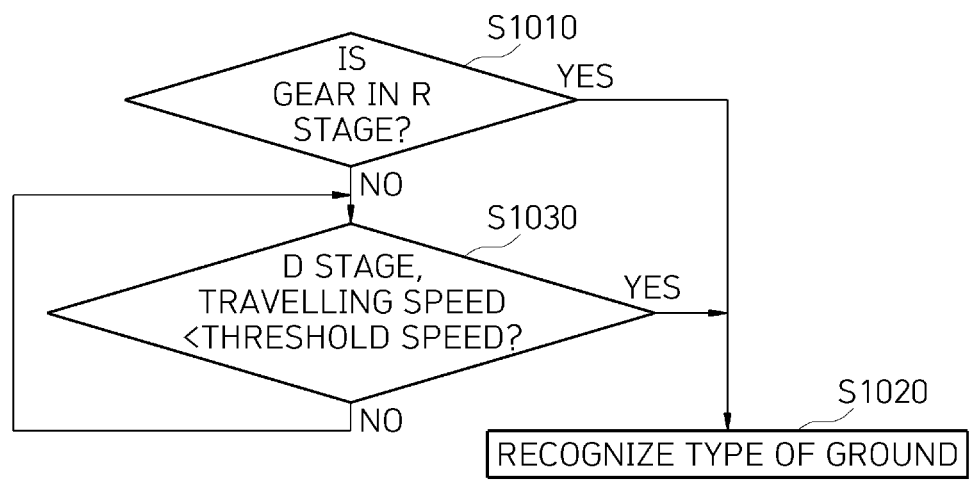
FIG. 11 is a flowchart showing a process of identifying an operation condition of a method of controlling a detecting distance of an ultrasonic sensor based on ground recognition according to an embodiment of the present invention.

FIG. 11 is a flowchart showing a process of identifying an operation condition of controlling a detecting distance of an ultrasonic sensor based on ground recognition according to an embodiment of the present invention.

The controller 600 according to the embodiment of the present invention identifies the operation condition of the ultrasonic sensor on the basis of a gear position and a vehicle speed and controls the threshold of the ultrasonic sensor 100 through the sensing threshold changer 400.

Referring to FIG. 11, the controller 600 identifies whether the gear is positioned in reverse R (S1010).

When the gear is positioned in reverse R (YES in S1010), the controller 600 performs a process of controlling a threshold of the ultrasonic sensor through recognizing the ground type (S1020).

When a result of the identification S1010 is that the gear is positioned in drive D (NO in operation S1010), the controller 600 identifies whether the travelling speed is less than a preset threshold speed (e.g., 10 km/h) (S1030).

When the travelling speed of the vehicle is less than the preset threshold speed of the vehicle (YES in operation S1030), the controller 600 performs a process of controlling a threshold of the ultrasonic sensor through the operation S1020 of recognizing the ground type, and when the travelling speed of the vehicle is greater than the preset threshold speed (NO in operation S1030), proceeds with an operation of waiting and identifying S1030 whether the travelling speed gets less than or equal to the preset threshold speed of the vehicle.

Accordingly, the embodiment of the present invention has an effect of improving the reliability of an application field of mitigating and preventing collisions with pedestrians by improving the detecting distance of the ultrasonic sensor on an asphalt road traveling at high speed or an indoor parking lot environment.

In addition, the embodiment of the present invention has an effect of increasing the detecting distance of an ultrasonic sensor for an SPAS having a small beam angle in the elevation direction, thereby increasing the parking space detection ability while reducing the automatic parking failure rate.

In addition, the present invention has an effect of improving the reliability of all application fields based on ultrasonic sensors and improving the usability.

On the other hand, according to the embodiment of the present invention, the present invention may be implemented without additional costs with only a control unit using a deep learning network for parking environment recognition, and when the vehicle already uses a semantic segmentation deep learning network, a ground recognition and a threshold adjustment may be implemented in real time by adding only a head to a decoder so that the system is provided with a higher reliability.

In the operation S850 of determining the ground type, the number of classes of the network output may correspond to the number of types of ground to be classified.

Figure 12:
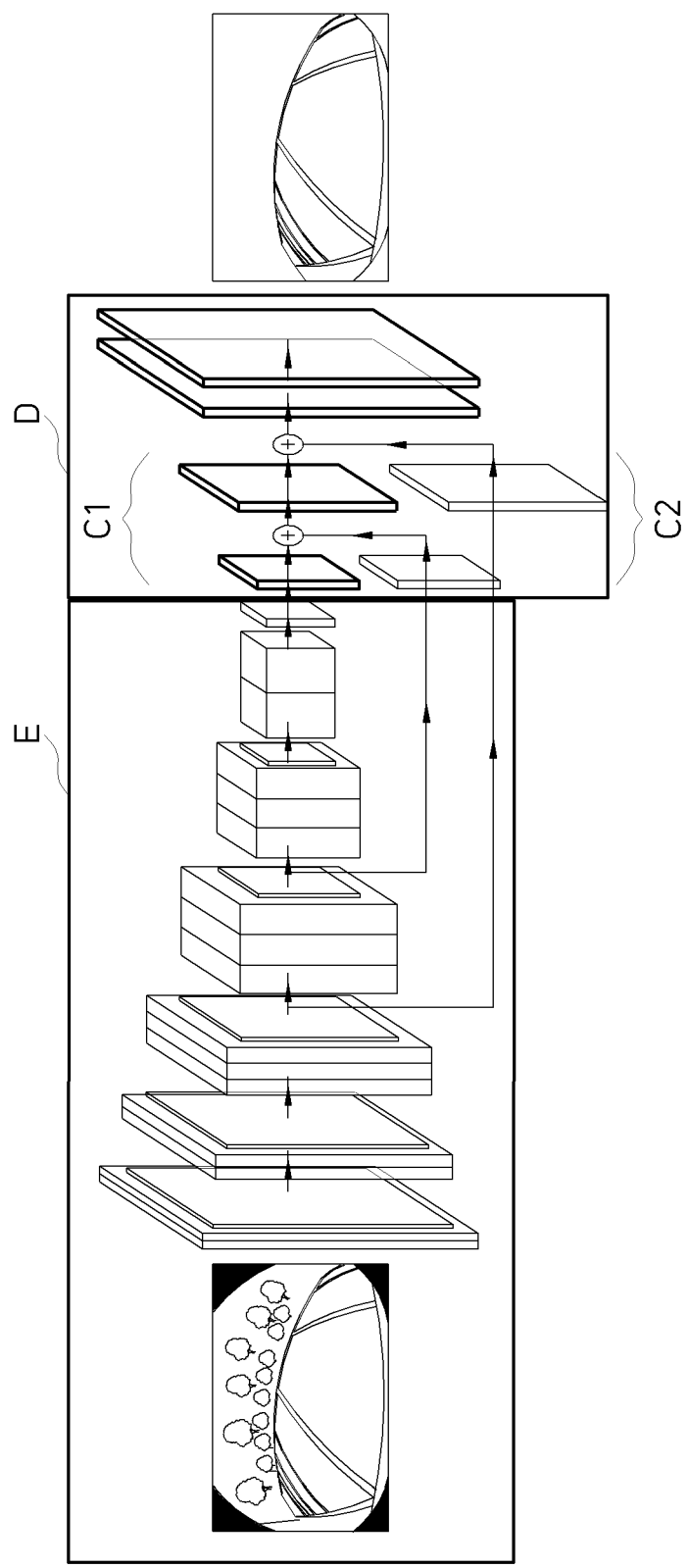
FIG. 12 is a reference diagram for describing the structure of a semantic segmentation network using a method of increasing the number of output classes by the number of types of ground according to an embodiment of the present invention.

That is, first, referring to FIG. 12, a method of increasing the number of classes C1 and C2 of the network output by the number of grounds to be classified may be used in semantic segmentation deep learning network comprises an encoder (E) and decoder (D).

The method may be implemented with a minimum amount of resources because only the final layer is increased in the entire network.

However, in this case, the amount of resources consumed for learning increases due to classifying all grounds of learning data.

Meanwhile, in the operation S850 of determining the ground type, an output of an encoder of the semantic segmentation network is shared, and a decoder part D1 is added as a semantic segmentation network for ground recognition.

Figure 13:
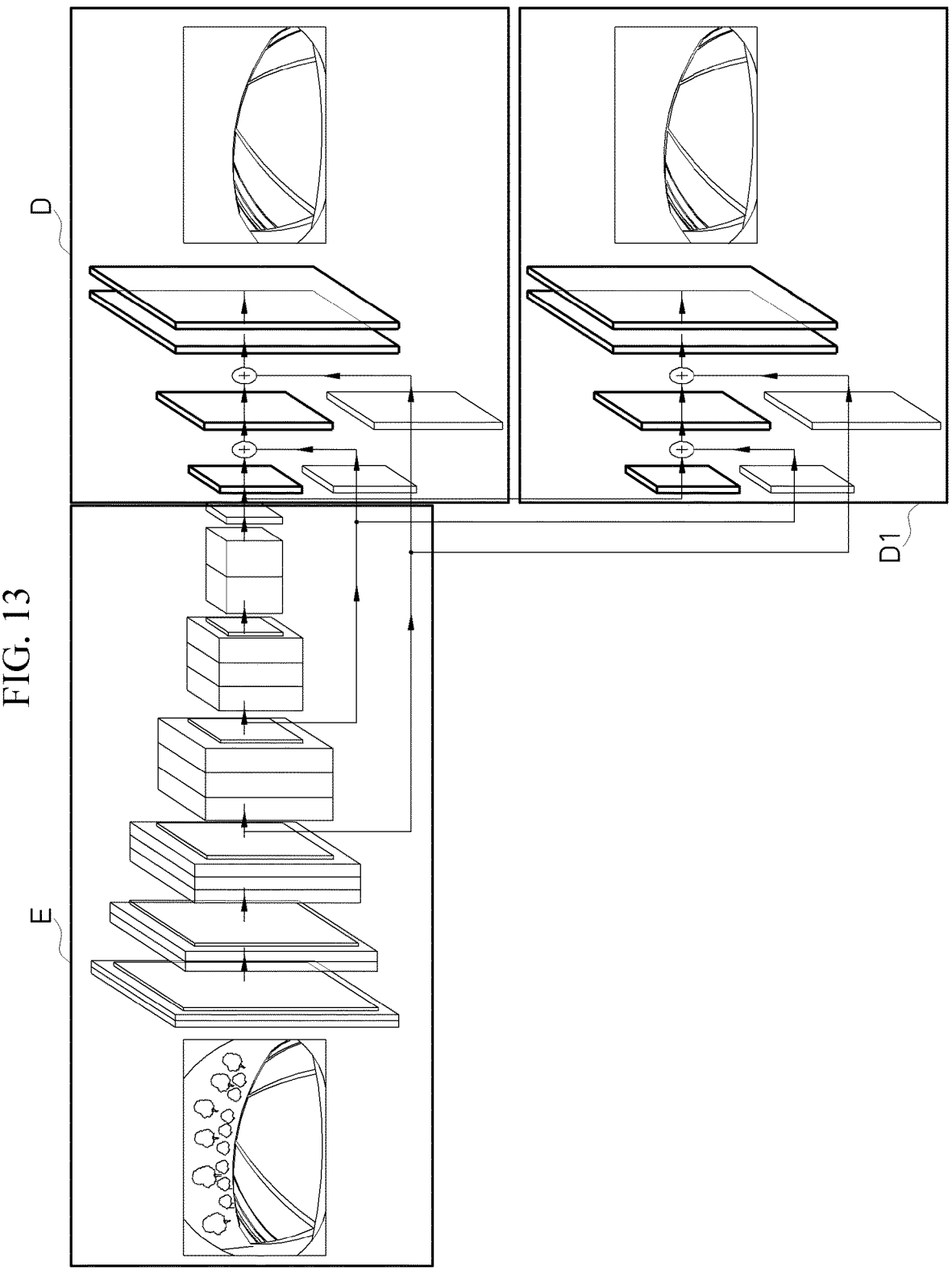
FIG. 13 is a reference diagram for describing the structure of a semantic segmentation network using a separate decoder to classify the ground type according to an embodiment of the present invention.

The second implementation, as shown in FIG. 13, involves using a method of sharing the output of the encoder E of the existing semantic segmentation network and adding only the decoder part D1 as a semantic segmentation network for ground recognition.

In this case, the implementation takes only half of the amount of computation for implementing the entire network, and the existing network and the new network are developable separately, thus providing an effect of consuming no resources in the learning operation.

As is apparent from the above, according to an embodiment of the present invention, a detecting distance can be increased by controlling an ultrasonic sensor specialized for short-range sensing.

According to an embodiment of the present invention, the reliability of an application field of mitigating and preventing collisions with pedestrians can be improved by improving the detecting distance of an ultrasonic sensor in an asphalt road during a travel at a high speed or an indoor parking lot environment.

In addition, according to an embodiment of the present invention, the detecting distance of an ultrasonic sensor for a smart parking assistance system (SPAS) having a small beam angle in the elevation direction can be increased, thereby increasing the parking space detection ability while reducing the automatic parking failure rate.

Therefore, the reliability and usability can be improved in all application fields based on ultrasonic sensors.

In addition, according to an embodiment of the present invention, since real time operation is not required, the present invention can be implemented without additional cost with only a control unit using a deep learning network for recognizing travelling and parking environments.

Each step included in the learning method described above may be implemented as a software module, a hardware module, or a combination thereof, which is executed by a computing device.

Also, an element for performing each step may be respectively implemented as first to two operational logics of a processor.

The software module may be provided in RAM, flash memory, ROM, erasable programmable read only memory (EPROM), electrical erasable programmable read only memory (EEPROM), a register, a hard disk, an attachable/detachable disk, or a storage medium (i.e., a memory and/or a storage) such as CD-ROM.

An exemplary storage medium may be coupled to the processor, and the processor may read out information from the storage medium and may write information in the storage medium. In other embodiments, the storage medium may be provided as one body with the processor.

The processor and the storage medium may be provided in application specific integrated circuit (ASIC). The ASIC may be provided in a user terminal. In other embodiments, the processor and the storage medium may be provided as individual components in a user terminal.

Exemplary methods according to embodiments may be expressed as a series of operation for clarity of description, but such a step does not limit a sequence in which operations are performed. Depending on the case, steps may be performed simultaneously or in different sequences.

In order to implement a method according to embodiments, a disclosed step may additionally include another step, include steps other than some steps, or include another additional step other than some steps.

Various embodiments of the present disclosure do not list all available combinations but are for describing a representative aspect of the present disclosure, and descriptions of various embodiments may be applied independently or may be applied through a combination of two or more.

Moreover, various embodiments of the present disclosure may be implemented with hardware, firmware, software, or a combination thereof. In a case where various embodiments of the present disclosure are implemented with hardware, various embodiments of the present disclosure may be implemented with one or more application specific integrated circuits (ASICs), digital signal processors (DSPs), digital signal processing devices (DSPDs), programmable logic devices (PLDs), field programmable gate arrays (FPGAs), general processors, controllers, microcontrollers, or microprocessors.

The scope of the present disclosure may include software or machine-executable instructions (for example, an operation system (OS), applications, firmware, programs, etc.), which enable operations of a method according to various embodiments to be executed in a device or a computer, and a non-transitory computer-readable medium capable of being executed in a device or a computer each storing the software or the instructions.

A number of exemplary embodiments have been described above. Nevertheless, it will be understood that various modifications may be made. For example, suitable results may be achieved if the described techniques are performed in a different order and/or if components in a described system, architecture, device, or circuit are combined in a different manner and/or replaced or supplemented by other components or their equivalents. Accordingly, other implementations are within the scope of the following claims.

Although exemplary embodiments of the present invention have been described for illustrative purposes, those skilled in the art will appreciate that various modifications, additions and substitutions are possible without departing from the scope and spirit of the present invention. Accordingly, the scope of the present invention is not to be limited by the above embodiments but by the claims and the equivalents thereof.

What is claimed is:

1. A system for adjusting a sensing threshold of an ultrasonic sensor based on a ground type, comprising:
    an ultrasonic sensor configured to recognize an object in front of or behind a vehicle;
    an image capturing unit configured to capture an image of a detection area of the ultrasonic sensor;
    a ground type recognizer configured to recognize a ground type of the detection area of the ultrasonic sensor based on the image captured by the image capturing unit; and
    a sensing threshold changer configured to, when a travelling speed of the vehicle satisfies a preset condition, adjust a sensing threshold of the ultrasonic sensor based on the recognized ground type.

2. The system of claim 1, further comprising a sensing threshold setter configured to set the sensing threshold of the ultrasonic sensor based on the recognized ground type.

3. The system of claim 2, wherein the sensing threshold setter is configured to set the sensing threshold based on:
    a plurality of waveforms reflected from a plurality of ground types, respectively; and
    a margin to a maximum waveform value for each waveform reflected from a ground of each ground type.

4. The system of claim 3, wherein the sensing threshold setter is configured to set the sensing threshold for each ground type based on the ground waveform reflected from each group type and the margin to the maximum waveform value for each group type.

5. The system of claim 4, wherein the sensing threshold setter is configured to set a default sensing threshold for the waveform reflected from each group type based on the maximum waveform value for each group type.

6. The system of claim 1, wherein the ground type recognizer is configured to classify the ground type via a semantic segmented deep learning for analyzing a plurality of pixels of the captured image corresponding to the detection area of the ultrasonic sensor.

7. The system of claim 6, wherein the ground type recognizer is configured to determine the ground corresponding to the detection area as a default ground type when:
    a ratio of (a) a first number of the pixels in the captured image that are classified as corresponding to the recognized ground type to (b) a second number of region of interest (ROI) pixels in the captured image, is less than an area ratio threshold, an average softmax output value of the recognized ground type is smaller than an average confidence level threshold, or a standard deviation of a softmax output value of the recognized ground type is less than a standard deviation threshold of a confidence level.

8. The system of claim 1, wherein the ultrasonic sensor is configured to change a sensing setting to select a sensing threshold corresponding to the recognized ground type.

9. The system of claim 8, wherein, when the vehicle is being parked, the sensing threshold changer is configured to control the ultrasonic sensor to operate according to the selected sensing threshold and periodically perform recognizing the ground type.

10. A method of determining a sensing threshold of an ultrasonic sensor based on a ground type, comprising:

storing a plurality of sensing thresholds for a plurality of ground types, respectively, each sensing threshold determined based on a captured image of each ground type and a ground reflected waveform of each ground type;

determining whether an operation condition of the ultrasonic sensor is satisfied;

in response to determining that the operation condition of the ultrasonic sensor is satisfied, identifying a first ground type based on a first image capturing a ground; and determining a sensing threshold of the ultrasonic sensor based on the identified first ground type.

11. The method of claim 10, wherein identifying the first ground type further comprises:

calculating a probability value of each pixel of the first image; and determining a ratio of pixels corresponding to the first ground type in a region of interest (ROI) of the first image, and an average and standard deviations of the probability value.

12. The method of claim 11, further comprising identifying an operation condition of the ultrasonic sensor based on a gear position and a vehicle speed.

\* \* \* \* \*